(12) United States Patent
Manadhata et al.

(10) Patent No.: US 10,984,099 B2
(45) Date of Patent: Apr. 20, 2021

(54) UNAUTHORIZED AUTHENTICATION EVENTS

(71) Applicant: EntIT Software LLC, Sunnyvale, CA (US)

(72) Inventors: Pratyusa K. Manadhata, Piscataway, NJ (US); Mijung Kim, Sunnyvale, CA (US); Manish Marwah, Palo Alto, CA (US)

(73) Assignee: Micro Focus LLC, Santa Clara, CA (US)

(*) Notice: Subject to any disclaimer, the term of this patent is extended or adjusted under 35 U.S.C. 154(b) by 4 days.

(21) Appl. No.: 15/689,043

(22) Filed: Aug. 29, 2017

(65) Prior Publication Data

US 2019/0065739 A1 Feb. 28, 2019

(51) Int. Cl.

| G06F 21/55 | (2013.01) |
| G06F 21/62 | (2013.01) |
| G06F 21/45 | (2013.01) |
| H04L 29/06 | (2006.01) |
| G06N 20/20 | (2019.01) |
| G06F 21/31 | (2013.01) |
| G06F 16/00 | (2019.01) |
| G06K 9/62 | (2006.01) |

(52) U.S. Cl.
CPC .......... G06F 21/554 (2013.01); G06F 21/316 (2013.01); G06F 21/45 (2013.01); G06F 21/552 (2013.01); G06F 21/6218 (2013.01); G06N 20/20 (2019.01); H04L 63/08 (2013.01); H04L 63/102 (2013.01); H04L 63/107 (2013.01); H04L 63/1425 (2013.01); G06F 16/00 (2019.01); G06K 9/6256 (2013.01)

(58) Field of Classification Search
None
See application file for complete search history.

(56) References Cited

U.S. PATENT DOCUMENTS

| 7,376,969 B1 * | 5/2008 | Njemanze .............. G06F 21/55 709/224 |
| 8,910,188 B1 | 12/2014 | Wang |
| 8,966,036 B1 * | 2/2015 | Asgekar ................ G06Q 50/01 707/706 |
| 9,378,361 B1 | 6/2016 | Yen et al. |
| 9,591,006 B2 | 3/2017 | Siva Kumar |
| 9,667,641 B2 | 5/2017 | Muddu et al. |
| 9,679,125 B2 | 6/2017 | Bailor |
| 9,690,933 B1 | 6/2017 | Singh |

(Continued)

OTHER PUBLICATIONS

Chebrolu et al.; Feature deduction and ensemble design of intrusion detection systems; 2005; Elsevier, Computers & Security 24; pp. 1-13, as printed. (Year: 2005).*

(Continued)

*Primary Examiner* — Saleh Najjar
*Assistant Examiner* — Michael W Chao (57) ABSTRACT

In some examples, for a given authentication event between a plurality of devices in a network, a system identifies a set of events, at the devices, that are temporally related to the given authentication event. The system applies a classifier on a collection of features associated with the set of events, and determines, based on an output of the classifier, whether the given authentication event is an unauthorized authentication event.

20 Claims, 4 Drawing Sheets

(56) References Cited

U.S. PATENT DOCUMENTS

| | | | |
|---|---|---|---|
| 9,881,179 B2 | 1/2018 | Patton | |
| 9,911,290 B1 | 3/2018 | Zalewski | |
| 9,985,984 B1* | 5/2018 | Chavez | H04L 63/1441 |
| 10,104,102 B1* | 10/2018 | Neumann | H04L 63/1416 |
| 10,120,746 B1* | 11/2018 | Sharifi Mehr | H04L 63/1425 |
| 10,257,227 B1* | 4/2019 | Stickle | G06F 21/554 |
| 10,289,819 B2* | 5/2019 | Stavrou | G06F 21/316 |
| 10,298,444 B2 | 5/2019 | Bishnoi | |
| 10,581,886 B1* | 3/2020 | Sharifi Mehr | H04L 63/1416 |
| 10,587,633 B2* | 3/2020 | Muddu | G06N 7/005 |
| 10,630,729 B2* | 4/2020 | Latham | H04L 67/18 |
| 10,645,109 B1* | 5/2020 | Lin | G06F 21/554 |
| 10,649,837 B2* | 5/2020 | Sharifi Mehr | H04L 63/1425 |
| 10,686,829 B2* | 6/2020 | Amit | G06F 21/554 |
| 10,721,254 B2* | 7/2020 | Kotinas | G06K 9/6251 |
| 10,721,264 B1* | 7/2020 | Dell'Amico | H04L 63/1433 |
| 10,735,457 B2* | 8/2020 | Rouatbi | H04L 63/1408 |
| 10,789,367 B2* | 9/2020 | Joseph Durairaj | G06F 21/552 |
| 10,848,510 B2* | 11/2020 | Chauhan | H04L 43/045 |
| 2004/0221163 A1 | 11/2004 | Jorgensen | |
| 2005/0262343 A1 | 11/2005 | Jorgensen | |
| 2006/0112039 A1* | 5/2006 | Wang | G06K 9/6293 706/20 |
| 2008/0184371 A1* | 7/2008 | Moskovitch | G06F 21/566 726/24 |
| 2009/0099988 A1* | 4/2009 | Stokes | G06F 15/16 706/20 |
| 2010/0095374 A1* | 4/2010 | Gillum | G06Q 30/02 726/22 |
| 2011/0302653 A1* | 12/2011 | Frantz | G06F 21/552 726/22 |
| 2011/0320816 A1 | 12/2011 | Yao | |
| 2012/0191630 A1* | 7/2012 | Breckenridge | G06N 20/00 706/12 |
| 2012/0290879 A1 | 11/2012 | Shibuya | |
| 2013/0139179 A1 | 5/2013 | Roll | |
| 2014/0181968 A1* | 6/2014 | Ge | H04L 63/1416 726/23 |
| 2014/0245439 A1 | 8/2014 | Day | |
| 2015/0161237 A1 | 6/2015 | Agarwal | |
| 2016/0006730 A1 | 1/2016 | Chari | |
| 2016/0026656 A1 | 1/2016 | Mansour | |
| 2016/0034361 A1* | 2/2016 | Block | H04L 63/1416 714/4.12 |
| 2016/0034712 A1 | 2/2016 | Patton | |
| 2016/0224618 A1 | 8/2016 | Robichaud | |
| 2016/0300059 A1* | 10/2016 | Abrams | G06F 21/554 |
| 2016/0308884 A1* | 10/2016 | Kent | G06F 21/316 |
| 2016/0308898 A1* | 10/2016 | Teeple | H04L 63/1433 |
| 2016/0335425 A1* | 11/2016 | Liu | G06F 21/44 |
| 2016/0337385 A1* | 11/2016 | Fujishima | H04L 63/1425 |
| 2016/0357301 A1 | 12/2016 | Padiri | |
| 2017/0063886 A1 | 3/2017 | Muddu | |
| 2017/0063909 A1* | 3/2017 | Muddu | G06F 16/254 |
| 2017/0063910 A1 | 3/2017 | Muddu | |
| 2017/0093902 A1* | 3/2017 | Roundy | H04L 63/1416 |
| 2017/0093910 A1 | 3/2017 | Gukal | |
| 2017/0272521 A1 | 9/2017 | Takahashi | |
| 2017/0277727 A1 | 9/2017 | Chen | |
| 2017/0302685 A1* | 10/2017 | Ladnai | G06F 16/9024 |
| 2017/0351739 A1 | 12/2017 | Zou | |
| 2018/0004948 A1* | 1/2018 | Martin | H04L 63/1425 |
| 2018/0027006 A1 | 1/2018 | Zimmermann | |
| 2018/0069893 A1 | 3/2018 | Amit | |
| 2018/0314742 A1 | 11/2018 | Taropa | |
| 2019/0026459 A1* | 1/2019 | Harutyunyan | G06F 21/552 |
| 2019/0036971 A1 | 1/2019 | Ford | |
| 2019/0173893 A1* | 6/2019 | Muddu | H04L 63/1416 |
| 2019/0190936 A1* | 6/2019 | Thomas | H04L 63/1425 |
| 2019/0266325 A1* | 8/2019 | Scherman | G06F 21/554 |
| 2020/0076837 A1* | 3/2020 | Ladnai | H04L 63/20 |
| 2020/0137097 A1* | 4/2020 | Zimmermann | G06F 21/6218 |
| 2020/0296124 A1* | 9/2020 | Pratt | G06N 20/00 |
| 2020/0314124 A1* | 10/2020 | Reybok, Jr. | H04L 63/06 |

OTHER PUBLICATIONS

Chawla et al., SMOTE: Synthetic Minority Over-Sampling Technique published Jun. 2002 (37 pages).
Kim et al., U.S. Appl. No. 15/689,045 entitled Extracting Features for Authentication Events filed Aug. 29, 2017 (36 pages).
Marwah et al., U.S. Appl. No. 15/689,047 entitled Training Models Based on Balanced Training Data Sets filed Aug. 29, 2017 (36 pages).
Mike Scutt, Information Security, RAPID7 Community and Blog, Introspective Intelligence: What Makes Your Network Tick, What Makes it Sick? Nov. 17, 2016 (5 pages).
Musthaler et al., Fortscale's user behavioral analytics solution provides full context when truly malicious behavior is detected, Jan. 2016 (5 pages).
RAPID7—Detecting Lateral Movement with Windows Event Logs downloaded Jul. 31, 2017 (4 pages).
RAPID7, Technical Primer, Managed Detection and Response downloaded Jul. 31, 2017 (4 pages).
Rod Soto, Dynamic Population Discovery for Lateral Movement (Using Machine Learning), https://www.slideshare.net/RodSoto2/dynamic-population-discovery-for-lateral-movement-using-machine-learning, downloaded Jul. 19, 2017 (101 pages).
Siadati et al., Detecting Malicious Logins in Enterprise Networks Using Visualization, 2016 (8 pages).
STRATA-v4 https://www.slideshare.net/RamShankarSivaKumar/strata-2015-presentation-detecting-lateral-movement, downloaded Jul. 19, 2017 (34 pages).
Vectra Networks, White Paper, Detect Insider Attacks in Real Time https://yellowcube.eu/wp-content/uploads/2017/06/wp-insider-threat-detection.pdf, 2017 (6 pages).
Vectra Networks, The Data Science Behind Vectra Threat Detections—https://yellowcube.eu/wp-content/uploads/2017/06/the-data-science-behind-vectra-threat-detection.pdf, 2016 (10 pages).
Wikipedia, Gradient Boosting last edited Jul. 28, 2017 (10 pages).
Wikipedia, Random forest last edited Jul. 23, 2017 (10 pages).
Alariki et al., Features Extraction Scheme for Behavioural Biometric Authentication in Touchscreen Mobile Devices, ISSN 0973-4562, vol. 11, No. 18 (2016); No. of pp. 14.
Feng et al; Security after Login: Identity Change Detection on Smartphones Using Sensor Fusion, Aug. 27 (Year: 2015) (6 pages).
Jakobsson et al, Implicit Authentication for Mobile Devices, (Year: 2009) (6 pages).
Kent et al, Differentiating User Authentication Graphs, Jul. 22 (Year: 2013) (4 pages).
Rybnik, et al., A Keystroke Dynamics Based System for User Identification, Jul. 9 (Year: 2008) (6 pages).
U.S. Appl. No. 15/689,045, Final Rejection dated Aug. 12, 2019, pp. 1-26 and attachments.
U.S. Appl. No. 15/689,045, Non-Final Rejection dated Apr. 26, 2019, pp. 1-28 and attachments.
U.S. Appl. No. 15/689,045, Notice of Allowance dated Nov. 14, 2019, pp. 1-11 and attachments.
Aruba, UEBA USE CASE, Compromised User and Host Detection using Behavioral Analytics dated on or before Feb. 23, 2018 (7 pages).
Mobin Javed, Detecting Credential Compromise in Enterprise Networks, Electrical Engineering and Computer Sciences, University of California at Berkeley, Dec. 16, 2016 (90 pages).

* cited by examiner

UNAUTHORIZED AUTHENTICATION EVENTS

BACKGROUND

To gain access to a network, a user may use a credential such as a username and password, a certificate, a security key, and so forth. User credentials can be stolen by an unauthorized entity. For example, a user may disclose the user's credential to the unauthorized entity, which may be masquerading as a legitimate service. Alternatively, the unauthorized entity may include malware that can track a user's inputs to extract a credential entered by the user, or can access stored information to retrieve the credential.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Once an unauthorized entity has obtained a user's credential, the unauthorized entity can move within a network. The movement of the unauthorized entity within the network using a valid credential is referred to as lateral movement. By performing lateral movement, the unauthorized entity seeks to find other vulnerable users (to obtain credentials of such other users or to obtain sensitive information belonging to such other users), vulnerable devices, and sensitive information. With lateral movement, the unauthorized entity can also access devices in the network to obtain information stored by or accessible by such devices, or to use resources of the devices. Devices in the network may store sensitive information, or can have access to information that ultimately allows the unauthorized entity to access a data repository containing sensitive information. Sensitive information can refer to financial information, technical information, or any other information that an enterprise or individual wishes to protect against disclosure to unauthorized entities (users, programs, or machines).

Because lateral movement involves the access of users or devices by an unauthorized entity based on use of a valid credential, traditional security mechanisms, such as malware detectors, may not be able to detect the unauthorized use of the credential. For example, traditional security mechanisms may not be able to distinguish between a user's authorized use of the user's own credential and an unauthorized entity's use of the same credential after stealing it.

In accordance with some implementations of the present disclosure, a machine-learning based approach is used to distinguish unauthorized authentication events (that use stolen or compromised credentials) from benign authentication events (which are authentication events by authorized entities). For a given authentication event between multiple devices in a network, a system according to some implementations of the present disclosure identifies a set of events at the devices, where the identified set of events are temporally related to the given authentication event.

To detect unauthorized authentication events (also referred to as detecting lateral movement), a classifier can be trained using a training data set. A classifier can also be referred to as a machine-learning model. A training data set refers to collections of features (sometimes arranged as feature vectors), where each collection of features is assigned a label indicating whether or not the collection of features is indicative of an unauthorized authorization event. A positive label specifies that the collection of features is indicative of unauthorized authentication event, while a negative label specifies that the collection of features is not indicative of an unauthorized authentication event.

A "feature" can refer to any characteristic that is extracted from event data associated with an authentication event. The feature can include an attribute retrieved from the event data, or an attribute computed based on the event data. In either case, the feature is considered to be extracted from event data.

Once the classifier is trained, the classifier is applied on a collection of features (e.g., a feature vector) associated with events, where the events can include the given authentication event as well as the set of events that are temporally related to the given authentication event. A classifier applied on a collection of features can refer to any of: (1) one classifier applied on the collection of features, or (2) one classifier applied on multiple collections of features, or (3) multiple classifiers applied on one collection of features, or (4) multiple classifiers applied on multiple collections of features. The system determines, based on an output of the classifier, whether the given authentication event is an unauthorized authentication event associated with lateral movement.

An authentication event is generated when a user or program at a first device in a network attempts to log into a second device in the network by offering a user's credential to the second device. In some examples, a credential can include a combination of a username and a password, a security certificate, a security key, or any other information that can be used to determine whether the user or the program at the first device is authorized to access the second device.

Figure 1:
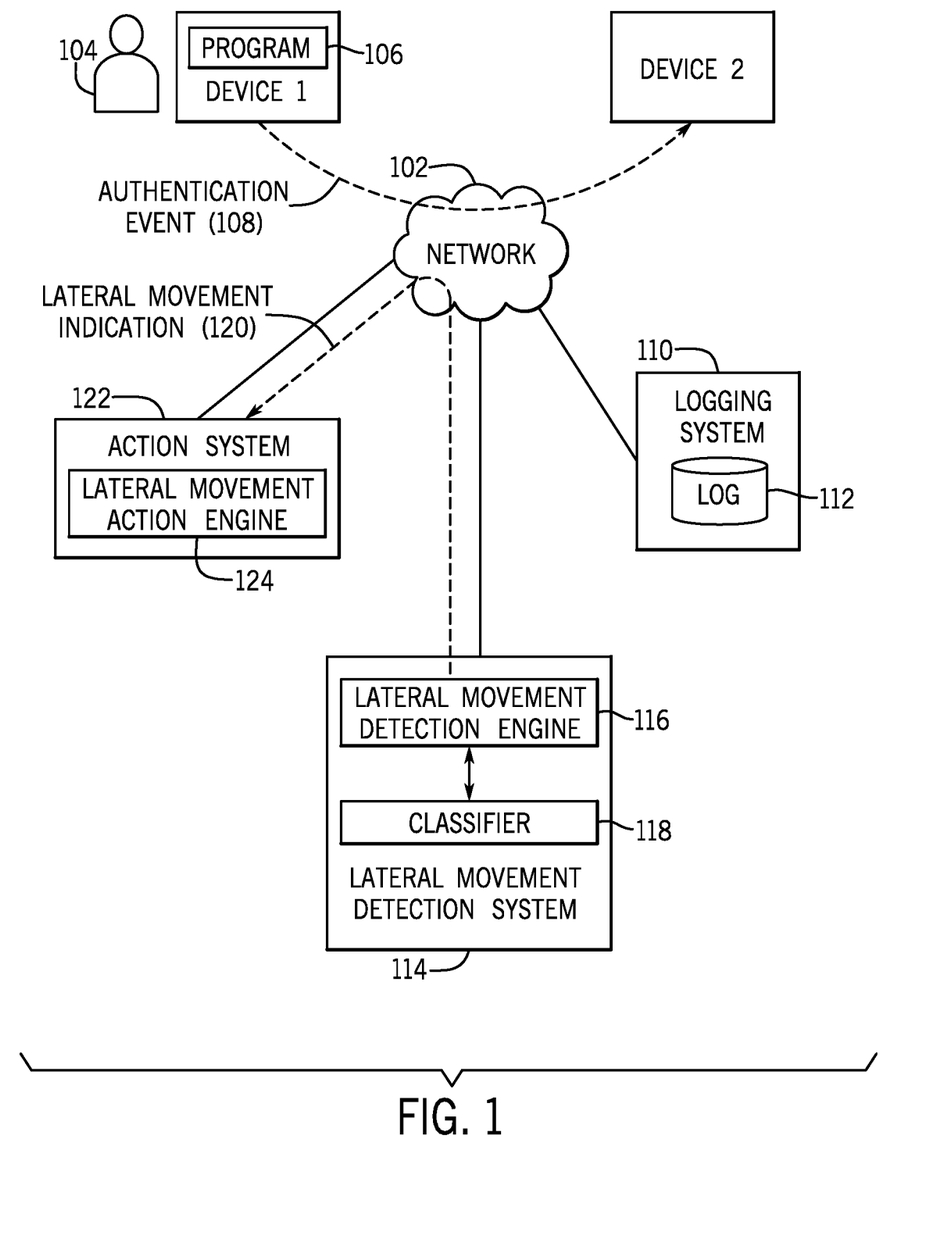
FIG. 1 is a block diagram of an arrangement that includes devices coupled over a network, and a lateral movement detection system according to some examples.

FIG. 1 shows an example where device 1 is coupled over a network 102 to device 2. The network 102 can include a wired network, a wireless network, or a combination of wired and wireless networks. Although just two devices as shown in FIG. 1, it is noted that a network arrangement can include more than two devices. Examples of devices include any or some combination of the following: a desktop computer, a notebook computer, a tablet computer, a smartphone, a server computer, a storage system, a communication node, or any other device that is capable of communicating over the network 102.

The devices can be part of an enterprise network, which is accessible by users of an enterprise (e.g., a company, a government agency, an educational organization, etc.). In other examples, the network 102 (or a portion of the network 102) can be a public network, such as the Internet.

A user 104 or a program 106 at device 1 can initiate an authentication event 108 with device 2. For example, the user 104 can type in the user's credential, or the user can use a security device (e.g., a badge, a smartphone, etc.) that stores a credential that can be communicated from the security device to device 1, such as by using a wireless connection (e.g., a Bluetooth link, a Wi-Fi link, a radio frequency identification (RFID) link, etc.). In another example, the user 104 at device 1 can attempt to authenticate a different user to device 2. The program 106, which includes machine-readable instructions, can include an application program, an operating system, and so forth. The program 106 can similarly provide a user's credential to initiate the authentication event 108.

In some examples, a logging system 110 can log event data of the authentication event 108 in a log 112, which can store various attributes off the authentication event 108. Examples of attributes in event data of an authentication event include any or some combination of the following: a timestamp (which indicates the time at which the authentication event 108 occurred), an identifier of an initiating user that initiated the authentication event 108 (the initiating user is already authenticated on the source device, and the initiating user wants to authenticate to the destination device—the initiating user wants to authenticate himself/herself, or authenticate a different user), an identifier of a destination user to be authenticated on a destination device (the destination user can be the same as the initiating user), an identifier of the source device (e.g., device 1), an identifier of a destination device (e.g., device 2), a type of authentication, a success/failure indication of the authentication event, and so forth. The log 112 can store event data of multiple authentication events among various devices that communicate over the network 102.

The log 112 can refer to a data repository (or multiple data repositories) to store event data. The log 112 can be stored on a storage device or a collection of storage devices.

In addition to logging event data of authentication events, the logging system 110 can also store event data of associated events in the log 112. In some examples, an associated event (that is associated with an authentication event) is an event that is temporally related to the authentication event. For example, the given authentication event can have a given timestamp. Events are associated with the authentication event if the event occurred at a source device or a destination device and has a timestamp that is within a time window that includes the timestamp of the given authentication event. The associated events can include events of a different type from authentication events. The combination of an authentication event and associated events can be referred to as a context of the authentication event. Further information regarding associated events is provided below.

FIG. 1 also shows a lateral movement detection system 114 that is connected to the network 102. The lateral movement detection system 114 is able to access the log 112 over the network 102 to determine whether any given authentication event is an unauthorized authentication event. The lateral movement detection system 114 includes a lateral movement detection engine 116 and a classifier 118 that can be applied on features extracted from a context of an authentication event, where the context includes the authentication event and associated events (that are temporally related to the authentication event) to determine whether the authentication event is an unauthorized authentication event.

As used here, an "engine" can refer to a hardware processing circuit, which can include any or some combination of the following: a microprocessor, a core of a multi-core microprocessor, a microcontroller, a programmable gate array, a programmable integrated circuit device, or any other hardware processing circuit.

The lateral movement detection system 116 also includes a classifier 118 that can be trained by the lateral movement detection system 114 and can be applied on features extracted from a context of a given authentication event to determine whether the given authentication event is an unauthorized authentication event. Although just one classifier 118 is shown in FIG. 1, it is noted that the lateral movement detection system 114 can use multiple classifiers (as part of an ensemble of classifiers) for application on features extracted from a context of an authentication event.

If a lateral movement is detected, the lateral movement detection engine 116 can output a lateral movement indication 120 over the network 102 to an action system 122, which includes a lateral movement action engine 124. The lateral movement action engine 124 can take action to address the detected lateral movement, in response to the lateral movement indication 120. For example, the lateral movement action engine 124 can establish a communication with device 1, device 2, or both devices 1 and 2, to cause the device(s) to halt or stop any further activity. As more specific examples, the lateral movement action engine 124 can shut down processes at device 1 and/or device 2 to prevent unauthorized access of information or resources at device 1 and/or device 2. In other examples, the lateral movement action engine 124 can take other actions, including sending a notification of the detected lateral movement to an administrator or other user, or triggering other security responses to the detected lateral movement.

By using a classifier 118 that is trained, the detection of lateral movement is based on the intuition that network and device activities during a normal authentication event differs from network and device activities from an unauthorized authentication event. Such network and device activities can include the following. A new process can be started on the source device (e.g., device 1) or the destination device (e.g., device 2). A process can refer to any activity or machine-readable instructions (such as a thread or a program) that can be started at a device. Another network or device activity can include a Domain Name System (DNS) lookup, in which a device issues a DNS query to determine a network address (e.g., an Internet Protocol (IP) address) assigned to a domain name of the device. For example, the source device can issue a DNS lookup to the destination device or another device. Alternatively, the destination device can issue a DNS lookup to the source device or another device.

Another network or device activity is a Hypertext Transfer Protocol (HTTP) request issued by a device. An HTTP request can be issued by a device to obtain information of another device. Thus, for example, the source device can issue an HTTP request to the destination device, or alternatively, the source device or destination device can issue an HTTP request to a different device.

Another network or device activity includes a transfer of data between devices, such as between the source and destination devices, or between a source or destination device and a different device. A further network or device activity is a security event, where a security event can be any event that triggers a security action at the device. For example, the device may include a malware detector that detects suspicious activities at the device caused by a virus or other malware, which can trigger the malware detector to issue a security alert or to take other action, such as to quarantine a process or to stop a process. Examples of other security events include an alert issued by an intrusion detection system (which has detected intrusion into a device or network), a firewall alert issued by a firewall, and so forth.

Although the starting of processes, DNS lookups, HTTP requests, transfer of data, and/or security events may occur during either a benign authentication event or an unauthorized authentication event, such activities can differ for the benign authentication event and the unauthorized authentication event. For example, many more processes or a previously unseen process can be started on the source or destination device associated with an unauthorized authentication event, and/or a larger number of DNS lookups or HTTP requests can be associated with an unauthorized authentication event. Moreover, an unauthorized authentication event can also be associated with transfer of an unusually large amount of data.

The classifier 118 can be trained to detect such activities associated with unauthorized authentication events. Using information of a context of an authentication event, the classifier 118 can determine, based on the features extracted from the context, whether the authentication event is authorized or non-authorized.

Figure 2:
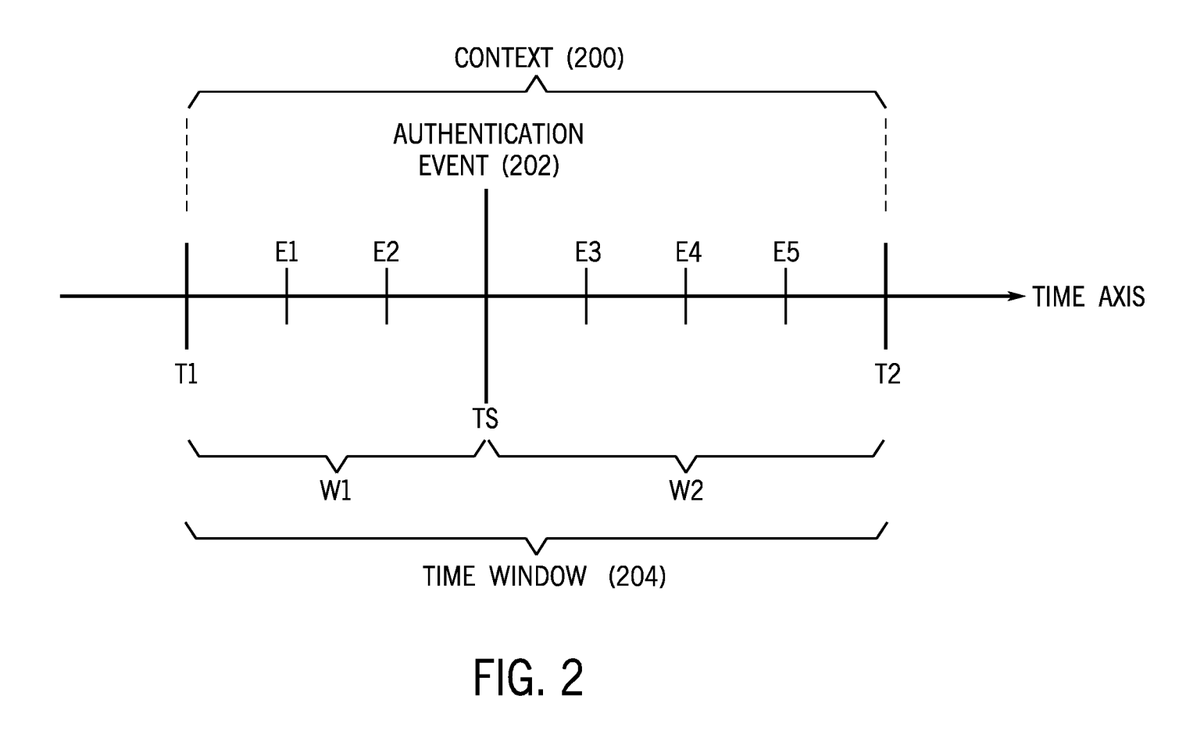
FIG. 2 shows an example context of an authentication event derived according to some examples.

FIG. 2 shows an example of how a context 200 for an authentication event 202 is determined. The authentication event 202 occurred at time TS, as represented by the timestamp of the event data representing the authentication event 202. A time window 204 is defined with respect to the time TS of the authentication event 202. The time window 204 includes the time TS of the authentication event 202. In examples according to FIG. 2, the time window 204 also includes a time interval W1 before the time TS, and a time interval W2 after the time TS. In some examples, W1 is equal to W2. In other examples, W1 is different from W2.

The time window 204 of FIG. 2 starts at time T1 (=TS−W1), and ends at time T2 (=TS+W2). Within the time window 204, various events E1 and E2 can occur at the source device (e.g., device 1 in FIG. 1) in the time interval W1 before the time TS of the authentication event 202, and various events E3, E4, and E5 can occur at the destination device (e.g., device 2 in FIG. 1) in the time interval W2 after the time TS.

The various events E1, E2, E3, E4, and E5 can include events corresponding to any of the activities noted above, such as starting a new process, performing a DNS lookup, performing an HTTP request, transferring data, a security event, or any other event.

Event data associated with the events E1, E2, E3, E4, and E5 is logged by the logging system 110 (FIG. 1) into the log 112 along with the event data of the authentication event 202.

In some examples, the values of W1 and W2 can be preset, such as by an administrator or other user. In further examples, the values of W1 and W2 can be learnt by the lateral movement detection engine 116 based on an analysis of past data and based on feedback provided regarding classifications of authentication events by the classifier 118. For example, a user can indicate that a classification made by the classifier 118 is correct or incorrect, and the classifier 118 can use this feedback to update itself.

Figure 3:
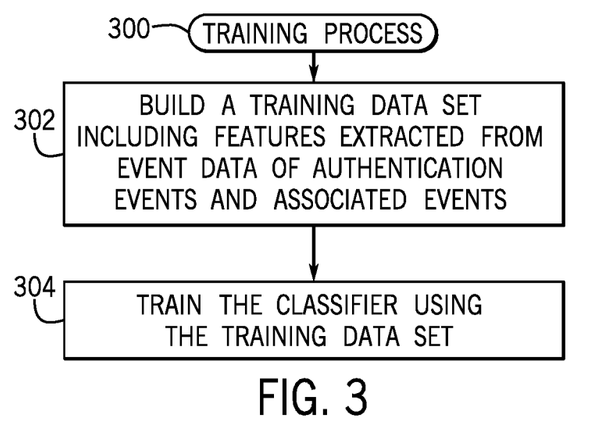
FIG. 3 is a flow diagram of a training process according to some examples.

FIG. 3 is a flow diagram of a training process 300 for training a classifier, according to some examples. The training process 300 can be performed by the lateral movement detection system 114 or by a different system. The training process 300 builds (at 302) a training data set including features extracted from event data of authentication events and associated events. For each of the authentication events, the respective context that includes associated events is determined, and the features of the context are extracted. The extracted features can be provided in corresponding collections of features, where each collection of features can be in the form of a feature vector, for example.

Examples of features that can be extracted from a context of an authentication event can include any or some combination of the following: a number of authentication events at the source device, a number of failed authentication events at the source device in the time window (e.g., 204 in FIG. 2) of the authentication event, a number of authentication events at the destination device in the time window, a number of failed authentication events at the source device in the time window, a number of failed authentication events at the destination device in the time window, a measure associated with processes that were started at the source device and at the destination device in the time window, a number of DNS events at the source device in the time window, a number of DNS events at the destination device in the time window, a number of connections from the source device in the time window, an amount of bytes communicated by the source device in the time window, a total number of packets communicated by the source device in the time window, a number of connections for the destination device in the time window, an amount of data communicated by the destination device in the time window, a total number of packets communicated by the destination device in the time window, and so forth.

Each feature vector in the training data set is associated with a classification label, which can be assigned by a user or another classifier. A positive classification label indicates that the respective feature vector is associated with a positive classification for an unauthorized authentication event, while a negative classification label indicates that the respective feature vector is associated with a negative classification for an unauthorized authentication event.

The training process 300 then trains (at 304) the classifier using the training data set.

The classifier can be updated in response to a triggering condition. For example, the classifier can be updated periodically (a time-based triggering condition) or in response to a request of an administrator or other user, or a program. Updating the classifier can involve using feedback provided regarding classifications of the classifier to modify the classifier.

Although reference is made to training just one classifier on the training data set built (at 302), it is noted that in alternative examples, multiple classifiers can be trained on the training data set. These multiple classifiers make up an ensemble of classifiers. The different classifiers can be trained using different machine learning techniques, including, as examples, any of the following: logistic regression, random forests, gradient boosting, neural networks, and so forth.

Gradient boosting and random forests are examples of techniques for producing an ensemble of classifiers. Gradient boosting is an ensemble technique where a weighted ensemble of weak models (e.g., shallow trees) are combined to produce the prediction for a classification task. In gradient boosting, the successive models (classifiers) are trained on the gradient of the loss function in a previous iteration.

Random forests include an ensemble of decision trees. The output of a model (classifier) is based on the aggregation of the outputs of all the individual trees. The trees are trained differently, and on a slightly different data set so their outputs are diverse. Each tree is trained on a bootstrap sample of the training data. A bootstrap sample is a sample of the same size as the original data obtained by performing sampling with replacement. Further, during tree construction, at each split a random subset of features is selected, and then the split is performed on the best features among this subset.

The random forests technique is an example of a technique in which different classifiers of an ensemble of classifiers can be trained using respective different samples of the training data set.

Figure 4:
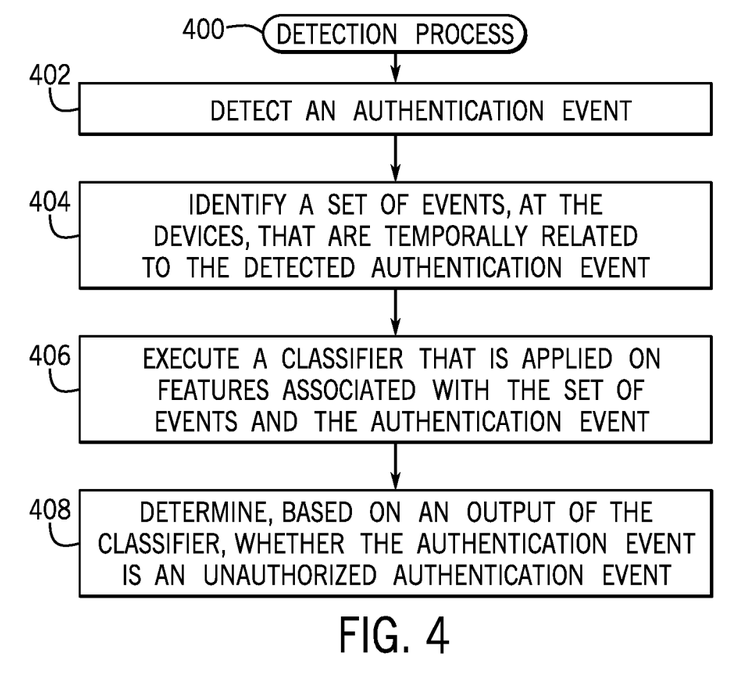
FIG. 4 is a flow diagram of a detection process of detecting unauthorized authentication events, according to some examples.

FIG. 4 is a flow diagram of a detection process 400 of detecting an unauthorized authentication event, according to some examples. The detection process 400 can be performed by the lateral movement detection engine 116, for example. The detection process 400 detects (at 402) an authentication event that includes a user credential submitted between a plurality of devices in a network.

The detection process 400 identifies (at 404) a set of events, at the devices, that are temporally related to the detected authentication event. The authentication event and the set of events make up a context of the authentication event.

The detection process 400 executes (at 406) a classifier (such as one trained according to the training process 300 of FIG. 3) that is applied on features associated with the context including the set of events and the authentication event.

Figure 5:
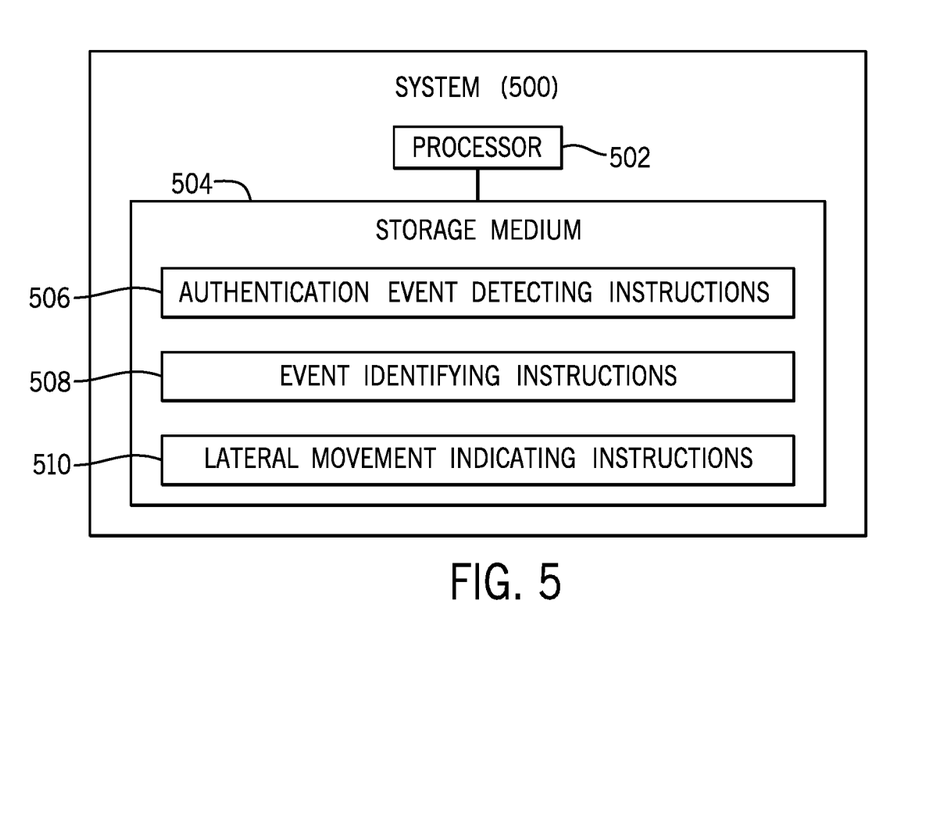
FIG. 5 is a block diagram of a system to detect unauthorized authentication events, according to further examples.

The detection process 400 determines (at 408), based on an output of the classifier, whether the authentication event is an unauthorized authentication event FIG. 5 is a block diagram of a system 500 that includes a processor (or multiple processors) 502. The system 500 further includes a non-transitory machine-readable or computer-readable storage medium 504 storing machine-readable instructions that are executable on the processor 502 to perform various tasks. Machine-readable instructions executable on a processor to perform a task can refer to machine-readable instructions executable on a single processor or on multiple processors to perform the task. A processor can include a microprocessor, a core of a multi-core microprocessor, a microcontroller, a programmable integrated circuit, a programmable gate array, or another hardware processing circuit.

The machine-readable instructions include authentication event detecting instructions 506 to detect an authentication event that includes a user credential submitted from a first device to a second device in a network. The machine-readable instructions further include event identifying instructions 508 to identify events within a time window including a time of the detected authentication event, the identified events comprising events of the first device and the second device.

The machine-readable instructions further include lateral movement indicating instructions 510 to indicate occurrence of an unauthorized lateral movement by an entity in the network based on applying a classifier on information associated with the identified events.

Figure 6:
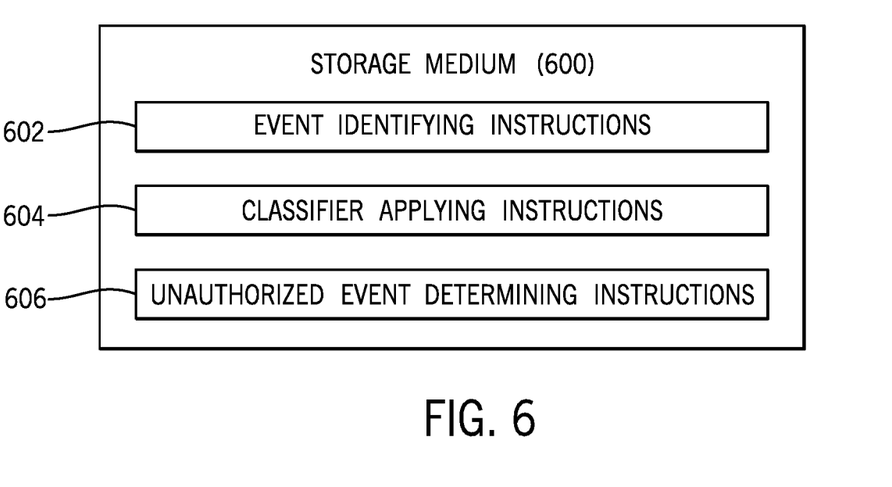
FIG. 6 is a block diagram of a storage medium storing machine-readable instructions for detecting unauthorized authentication events, according to additional examples.

FIG. 6 is a block diagram of a non-transitory machine-readable or computer-readable storage medium 600 that stores machine-readable instructions executable by a system to perform various tasks. The machine-readable instructions include event identifying instructions 602 to identify, for a given authentication event between a plurality of devices in a network, a set of events, at the devices, that are temporally related to the given authentication event. The machine-readable instructions include classifier applying instructions 604 to apply a classifier on a collection of features associated with the set of events. The machine-readable instructions further include unauthorized authentication event determining instructions 606 to determine, based on an output of the classifier, whether the given authentication event is an unauthorized authentication evented events.

The storage medium 504 or 600 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
for a given authentication event between a plurality of devices in a network, identify a set of events within a time window that includes a time of the given authentication event, wherein the set of events includes events that are temporally related to the given authentication event and that are of a different type from the given authentication event, wherein the plurality of devices include a first device at which a user or program initiated the given authentication event with a second device, and wherein the identifying of the set of events comprises:
identifying events of the first device only in a specified first time interval before the time of the given authentication event, and identifying events of the second device only in a specified second time interval following the time of the given authentication event;

apply a classifier on a collection of features associated with the set of events including the events that are of the different type from the given authentication event;

determine, based on an output of the classifier, whether the given authentication event is an unauthorized authentication event; and update the classifier in response to a triggering condition.

2. The non-transitory machine-readable storage medium of claim 1, wherein a length of the specified first time interval and a length of the specified second time interval are based on historical data.

3. The non-transitory machine-readable storage medium of claim 1, wherein the set of events comprises an event relating to a domain name system (DNS) lookup between devices, and another event comprising a Hypertext Transfer Protocol (HTTP) request from a device.

4. The non-transitory machine-readable storage medium of claim 1, wherein determining that the given authentication event is the unauthorized authentication event comprises identifying the given authentication event as a lateral movement in the network by an unauthorized entity.

5. The non-transitory machine-readable storage medium of claim 1, wherein the output of the classifier is based on further applying the classifier on a collection of features associated with the given authentication event, and wherein the applying of the classifier on the collection of features associated with the given authentication event and the applying of the classifier on the collection of features associated with the set of events comprises applying an ensemble of classifiers on the collection of features associated with the given authentication event and on the collection of features associated with the set of events.

6. The non-transitory machine-readable storage medium of claim 5, wherein the ensemble of classifiers comprises classifiers derived according to different machine learning techniques.

7. The non-transitory machine-readable storage medium of claim 5, wherein the ensemble of classifiers comprises classifiers trained using respective different samples of a labeled data set.

8. The non-transitory machine-readable storage medium of claim 1, wherein the instructions upon execution cause the system to:

extract features of contexts associated with authentication events, each context of the contexts including associated events of a respective authentication event; and learn the classifier using the extracted features of contexts associated with authentication events in a labeled data set.

9. The non-transitory machine-readable storage medium of claim 1, wherein the triggering condition comprises a time-based condition or a user-initiated condition.

10. The non-transitory machine-readable storage medium of claim 1, wherein the instructions upon execution cause the system to:

receive a first parameter value that defines the specified first time interval; and receive a second parameter value that defines the specified second time interval.

11. The non-transitory machine-readable storage medium of claim 10, wherein the instructions upon execution cause the system to:

determine the specified first time interval based on the time of the given authentication event less the first parameter value; and determine the specified second time interval based on the time of the given authentication event plus the second parameter value.

12. A system comprising:

a processor; and a non-transitory storage medium storing instructions that are executable on the processor to:

detect an authentication event that includes a user credential submitted from a first device to a second device in a network;

identify non-authentication events temporally related to a time of the detected authentication event, wherein the identifying of the non-authentication events comprises:

identifying events of the first device only in a specified first time interval before the time of the detected authentication event, and identifying events of the second device only in a specified second time interval after the time of the detected authentication event;

indicate an occurrence of an unauthorized lateral movement by an entity in the network based on applying a classifier on information associated with the identified non-authentication events within a time window, wherein the classifier is part of an ensemble of classifiers; and train each classifier of the ensemble of classifiers using different samples from a labeled data set.

13. The system of claim 12, wherein the applying of the classifier comprises applying the classifier on features extracted from identified non-authentication events within the time window.

14. The system of claim 12, wherein the applying of the classifier comprises applying the ensemble of classifiers on the information associated with_the identified non-authentication events within the time window to detect the occurrence of the unauthorized lateral movement.

15. The system of claim 12, wherein the instructions are executable on the processor to:

receive a first parameter value that defines the specified first time interval; and receive a second parameter value that defines the specified second time interval.

16. The system of claim 15, wherein the instructions are executable on the processor to:

determine the specified first time interval based on the time of the detected authentication event less the first parameter value; and determine the specified second time interval based on the time of the detected authentication event plus the second parameter value.

17. The system of claim 12, wherein the identifying of the non-authentication events comprises identifying a first event comprising a domain name system (DNS) lookup and a second event comprising a Hypertext Transfer Protocol (HTTP) request.

18. The system of claim 17, wherein the instructions are executable on the processor to:

apply the classifier on features associated with the first event and the second event.

19. A method comprising:

detecting, by a system comprising a hardware processor, an authentication event that includes a user credential submitted from a first device to a second device in a network;

identifying, by the system, a set of events that are temporally related to the detected authentication event, wherein the set of events is in a time window and includes events that are of a different type from the detected authentication event, wherein the time window includes a time of the detected authentication event, and wherein the identifying of the set of events comprises:

identifying events of the first device only in a specified first time interval before the time of the detected authentication event, and identifying events of the second device only in a specified second time interval following the time of the detected authentication event;

executing, by the system, a classifier that is applied on features associated with the set of events and the detected authentication event;

determining, by the system based on an output of the classifier, whether the detected authentication event is an unauthorized authentication event; and updating the classifier in response to a triggering condition.

20. The method of claim 19, wherein the identifying of the set of events comprises identifying a first event comprising a domain name system (DNS) lookup and a second event comprising a Hypertext Transfer Protocol (HTTP) request, and wherein the classifier is applied on features associated with the first event and the second event.

* * * * *